United States Patent Office.

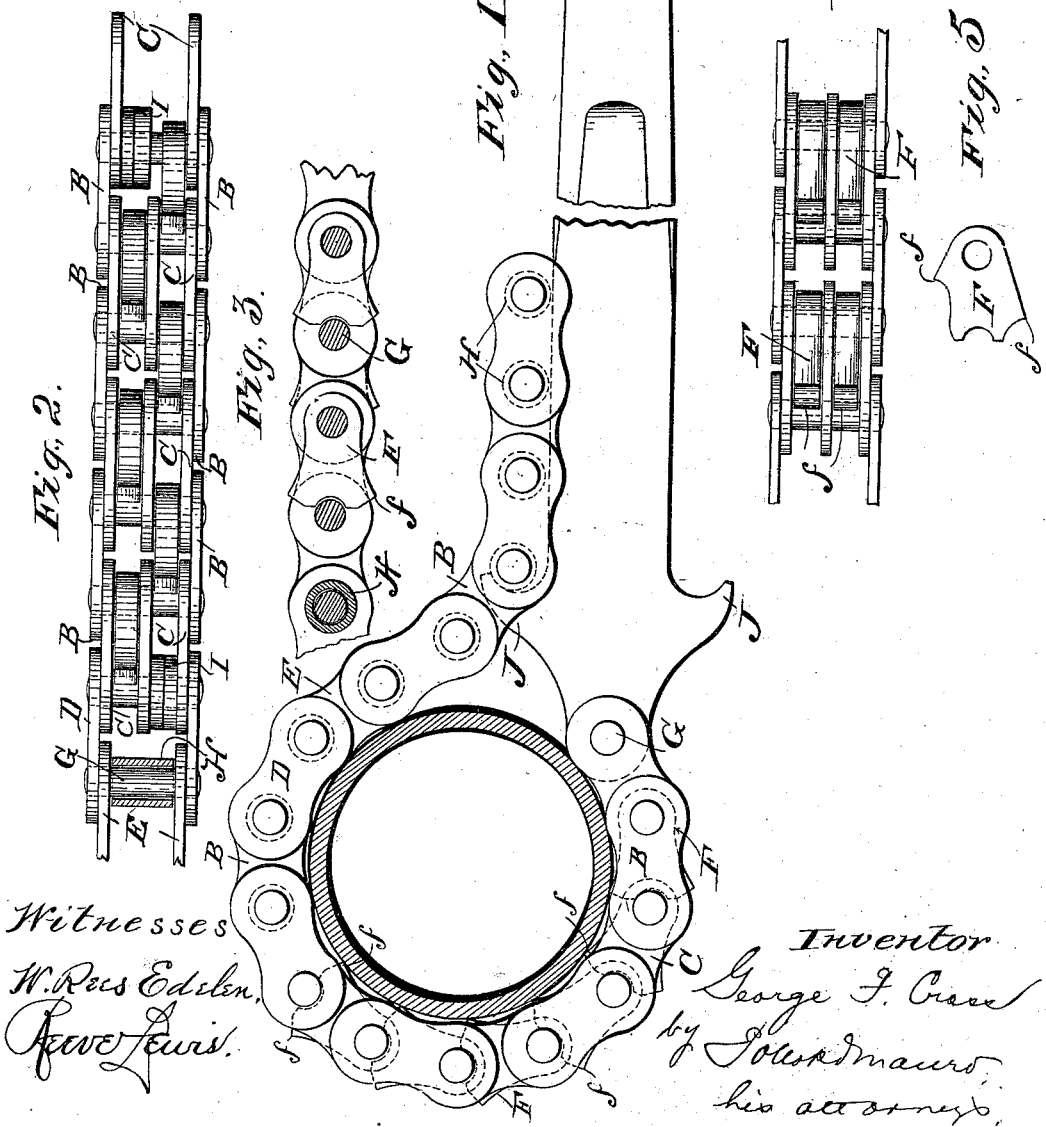

GEORGE F. CRASS, OF ITHACA, NEW YORK, ASSIGNOR OF ONE-HALF TO BENJAMIN F. SLOCUM, OF SAME PLACE.

CHAIN PIPE-WRENCH.

SPECIFICATION forming part of Letters Patent No. 555,931, dated March 10, 1896.

Application filed August 2, 1895. Serial No. 558,017. (No model.)

*To all whom it may concern:*

Be it known that I, GEORGE F. CRASS, of the city of Ithaca, county of Tompkins, and State of New York, have invented a new and useful Improvement in Chain Pipe-Wrenches, which is fully set forth in the following specification.

My invention consists in the novel construction of the chain and in the relation of the chain and its different parts to the pipe and the handle, whereby the tool as a whole is cheap to manufacture, convenient and efficient in use, and whereby the pipe is readily and firmly grasped and turned.

My chain pipe-wrench consists of a shank and a chain pivoted to the shank near its end, the shank being provided near this end with a hook or claw on either side. The chain consists of a series of links. These links are not all the same. The outer links, or those which are far away from the handle, are so constructed that they are adapted to engage with the claw on either side of the shank after the chain has been put around the pipe, thereby making the tool reversible. The inner links, or those near to the shank, are provided with a series of teeth, projections, or dogs, which grip the pipe when in proper position, preferably at a number of different points in its circumference, thereby firmly holding the pipe and enabling it to be readily turned as desired.

The accompanying drawings will serve to illustrate my invention.

Figure 1 is an elevation of a chain wrench constructed in accordance with my invention and having a pipe in its grip. Fig. 2 is an edge view of the chain. Fig. 3 is a detail sectional view of the chain. Fig. 4 shows another arrangement of the parts of the chain, and Fig. 5 is a detail of one of the dogs.

A is the shank or handle. The chain is pivoted to the handle near its lower end and preferably at or near the middle of the handle. This chain is composed of an inner series of alternately broad links B B and narrow links C C near the handle and an outer series of alternately broad links D D and narrow links E E more remote from the handle. The links B B, D D, and E E, apart from their pins, may each be formed of two similar pieces of flat metal, and the links C C may be formed of three such pieces.

F F are pivoted dogs.

G G are pins which unite the remaining parts of each link and which also unite the links together. Upon certain of these pins the dogs F F are pivoted.

H H are collars to certain of the pins G G.

I I are washers, whose functions are hereinafter explained.

J J are claws on each side of the shank or handle.

In the form that I prefer the links B B and C C, with the dogs to which they are related, are united by pins in the following manner: Beginning at the outer end of a broad inner link B, a pin G passes through a hole in one of the pieces of which such link is composed, then through a similar hole in one of the pieces of a narrow inner link C adjacent thereto, then through a similar hole in a pivoted dog F, then through a similar hole in the central piece of the narrow link C, then close to a depression, in shape like the arc of a circle, in the outer end of another pivoted dog F, then through a similar hole in each remaining piece of the narrow link C and broad link B. The order of arrangement of the parts through which the pin at the other end of the same broad link passes is the same as that already described except that the position of the dogs in reference to the central piece of link C is transposed. A dog is pivoted upon successive pins alternately to the right and to the left of the central piece of each narrow link C.

The dog is smaller at its inner end, where it is pivoted upon the pin. Its outer end is somewhat enlarged, so that this end is wider than those portions of the links to which it is adjacent. A sharp edge or angle $f$ is formed on each side of this end of the dog, extending slightly beyond the upper and under sides of the adjacent link. The edges are especially adapted to engage and hold the pipe, whichever side of the chain may be applied thereto. Between the outer edges of each dog there is a cut or depression, preferably shaped like the arc of a circle. The outer end of each dog thus fits closely against the pin adjacent thereto. The size of this cut or depression in the outer end of the dog should be such in relation to the pin that, while the dogs are held in position between the links of the chain and give support to the links against lateral pressure, there is still a small amount of play between the outer ends of the dogs and the pins. This secures a more perfect engagement with the pipe.

At the outer end of the outermost link of the series of inner links, there being no dog pivoted to the pin, I put upon the pin one or more washers I I to protect the link against lateral pressure. By a similar washer or washers I protect the inner end of the innermost link of the series of inner links against lateral pressure, the pin there having no dog whose outer end is adjusted close thereto.

The outer series of links needs but a brief description. The broad links D D and the narrow links E E of this series are similar to those already described, omitting the dogs and the central piece of each narrow link. The opposite parts of each link of this outer series are kept apart by a collar placed around each pin. This collar is larger than the holes in the links, and therefore keeps the links separated the width of the collar. The different parts of these links are arranged sufficiently far apart to permit of their locking over the claws J J on either side of the handle or shank. I prefer that this collar should rotate freely upon the pin. Though I prefer the rotating collar, a pin enlarged, where the collar would otherwise be placed, may be used.

The arrangement of dogs alternately to the right and to the left of the center of the chain I consider advantageous. The dogs thereby grip the pipe at several points effectively distributed. The slight play between the outer end of each dog and the pin adjacent thereto I also consider advantageous. The dogs must be of the proper length in relation to the links and the position of the pins passing through the same to secure this. The links of the chain and the dogs grasp the pipe firmly, but at the same time the sharp edges of the dog do not project so far beyond the edges of the links as to injure the pipe. This is accomplished without great expense, or any very great nicety in manufacture. While I prefer that the depression on the outer end of the dog should be shaped like the arc of a circle, it may be of any convenient shape.

The foregoing description shows one form in which my invention may be put into practical use. The dogs may also be adjusted to the chain and shaped as shown in Fig. 4, in which two dogs are pivoted side by side upon one pin, with the central piece of a narrow inner link between them. Cuts or depressions in the jaws, similar to those already described, cause the other ends of the dogs to fit against the next succeeding pin, at the same time affording a certain amount of play. The engaging edges of the dogs which engage the pipe are much nearer the pivoted end on one side of the dog than on the other, the dog being slightly cut away on one side and cut away for a much greater distance on the other side. Many variations from what has already been shown can readily be made without departing from my invention.

What I claim, and desire to secure by Letters Patent, is—

1. In a chain pipe-wrench the combination with a shank or handle, of a chain, one or more independent dogs pivoted at one end to said chain and means for engaging the other end of the chain with a shank or handle, substantially as described.

2. In a chain pipe-wrench, the combination of a shank or handle, a chain having one or more dogs pivotally attached thereto at the inner end thereof, and a cut or depression in the outer end thereof, with which another part of the chain fits closely, whereby the movement of the dog in respect to the adjacent parts of the chain is limited, and means for engaging the outer end of the chain with the shank or handle, substantially as described.

3. In a chain pipe-wrench, the combination of a shank or handle with one or more claws, a chain composed of a series of interlapping links or connecting-pivots therefor, independent dogs on one or more of the connecting-pivots and collars on one or more of said pivots, assembled together and operating, subtantially as described.

4. In a chain pipe-wrench, the combination of a shank or handle with one or more claws, a chain having broad inner links, narrow inner links, broad outer links and narrow outer links, connecting-pivots for said links, independent dogs on one or more of said connecting-pivots, a collar upon one or more of the pins of the outer links, assembled together and operating, substantially as described.

5. In a chain pipe-wrench, the combination of a shank or handle with one or more claws, a chain having broad inner links, narrow inner links, broad outer links and narrow outer links, connecting-pivots for said links and independent dogs on one or more of said pivots, assembled together and operating, substantially as described.

6. In a chain pipe-wrench, the combination of a shank or handle with one or more claws, a chain having broad inner links, narrow inner links, broad outer links and narrow outer links, one or more dogs pivotally attached to the chain at the inner end thereof, and having a cut or depression in the outer end thereof with which another part of the chain fits closely, whereby the movement of the dog in respect to the adjacent parts of the chain is limited, substantially as described.

7. A chain adapted for use in a chain pipe-wrench having one or more dogs pivotally attached thereto at one end thereof, and means whereby the movement of the other end of the dog in respect to the adjacent parts of the chain is limited, substantially as described.

In testimony whereof I have signed this specification in the presence of two subscribing witnesses.

GEORGE F. CRASS.

Witnesses:
W. T. WRIGHT,
OTIS E. WOOD.